(12) United States Patent
Lee et al.

(10) Patent No.: US 10,595,006 B2
(45) Date of Patent: Mar. 17, 2020

(54) METHOD, SYSTEM AND MEDIUM FOR IMPROVING THE QUALITY OF 2D-TO-3D AUTOMATIC IMAGE CONVERSION USING MACHINE LEARNING TECHNIQUES

(71) Applicant: Marvel Digital Limited, Wanchai (HK)

(72) Inventors: Ying Chiu Herbert Lee, Wanchai (HK); Ho Sang Lam, Wanchai (HK); Tin Wai Grace Li, Wanchai (HK)

(73) Assignee: Marvel Digital Limited, Wanchai (HK)

( * ) Notice: Subject to any disclaimer, the term of this patent is extended or adjusted under 35 U.S.C. 154(b) by 215 days.

(21) Appl. No.: 15/784,875

(22) Filed: Oct. 16, 2017

(65) Prior Publication Data

US 2018/0109776 A1 Apr. 19, 2018

(30) Foreign Application Priority Data

Oct. 14, 2016 (HK) .................................. 16111899.1

(51) Int. Cl.
*H04N 13/261* (2018.01)
*G06N 20/00* (2019.01)
*G06K 9/46* (2006.01)
*G06K 9/00* (2006.01)
*G06K 9/62* (2006.01)
*H04N 13/128* (2018.01)
(Continued)

(52) U.S. Cl.
CPC ....... *H04N 13/261* (2018.05); *G06K 9/00208* (2013.01); *G06K 9/4628* (2013.01); *G06K 9/6256* (2013.01); *G06K 9/6271* (2013.01); *G06N 20/00* (2019.01); *H04N 13/128* (2018.05); *H04N 13/271* (2018.05); *G06N 3/0454* (2013.01)

(58) Field of Classification Search
None
See application file for complete search history.

(56) References Cited

U.S. PATENT DOCUMENTS 6,381,346 B1 * 4/2002 Eraslan .............. G06K 9/00221
345/420
2004/0032980 A1 2/2004 Harman
(Continued)

FOREIGN PATENT DOCUMENTS

CN 101702781 A 5/2010
CN 101917643 A 12/2010
(Continued)

OTHER PUBLICATIONS

Nov. 7, 2016 Search Report for Hong Kong Short-Term Patent Application concerning Hong Kong Patent No. HK1224513 A.

*Primary Examiner* — Kevin Ky
(74) *Attorney, Agent, or Firm* — Duane Morris, LLP

(57) ABSTRACT

A method, system and medium for improving the quality of 2D-to-3D automatic conversion in a computing device by using machine learning techniques is provided, comprising: receiving new 2D image from user input; recognizing multiple objects in the new 2D image by machine learning algorithm; obtaining the hierarchical relations among objects according to the features of the said objects; improving the quality of 3D image according to the hierarchical relations. The implementation of this invention provides a more distinct classification of objects in a 2D image, thereby improving the 2D-to-3D conversion in the computing device.

14 Claims, 6 Drawing Sheets

(51) Int. Cl.
H04N 13/271 (2018.01)
G06N 3/04 (2006.01)

(56) References Cited

U.S. PATENT DOCUMENTS

2013/0141435 A1    6/2013  Cho et al.
2017/0221371 A1*   8/2017  Yang ........................ G09B 5/06
2018/0109776 A1    4/2018  Lee et al.

FOREIGN PATENT DOCUMENTS

| CN | 102427539 A | 4/2012 |
| CN | 105791803 A | 7/2016 |
| CN | 105979244 A | 9/2016 |
| WO | WO2018068755 A1 | 4/2018 |

* cited by examiner

METHOD, SYSTEM AND MEDIUM FOR IMPROVING THE QUALITY OF 2D-TO-3D AUTOMATIC IMAGE CONVERSION USING MACHINE LEARNING TECHNIQUES

CROSS-REFERENCE TO RELATED APPLICATION

This application claims the benefit and priority in and to Hong Kong Patent Application No. 16111899.1, filed Oct. 14, 2016, now Hong Kong Short-Term Patent No. HK1224513, issued Aug. 18, 2017, which is incorporated by reference herein in its entirety.

Further, any reference or product disclosed herein is also incorporated by reference herein in its entirety.

FIELD OF THE INVENTION

This invention relates to image conversion technique, more particularly, relates to a method, system and medium for improving the quality of 2D-to-3D automatic conversion by using machine learning techniques.

BACKGROUND OF THE INVENTION

For techniques to convert 2D images to 3D images, the available methods are: 1) selecting 2D images; 2) analyzing the selected 2D images; 3) creating an automatic depth map using a conversion engine; 4) if the automatic depth map is a bad depth map, adjusting the following parameters: Depth-Scene, Perspective Setting, High-Dynamic-Range (HDR), Depth Level, Zero Plane Position, Depth Refine, Roto the mass; 5) manually adjusting the depth value of the mass and the edge; and 6) creating a new depth map.

Some known techniques to convert 2D images to 3D images have a conversion engine that use contrast and edge of color to perform conversion. In a depth map, depths of different image blocks depend on the target distance. Since the foreground is close to the observer, it can be brighter and nearly white. The background can be nearly black.

These available techniques cause the following limitations:

a) If the color of background is similar to the color of the major target, the conversion engine can assign wrong depth values for the major target and background. For example, for a man standing on a white ground with a pair of white shoes, the conversion engine can assign the white shoes and the white ground as the same layer and the same depth for processing.

b) Parameter adjustment to refine depth map is required after a depth map is created by the conversion engine. This parameter adjustment procedure is completed manually, and must be repeated every time a similar 2D image is converted. Thus, the procedure is time-consuming.

c) Also, conversion procedure must be performed for every single frame in a video. Further, the depth map cannot be reused for similar frames.

Thus, there is a need for a more efficient and accurate method and system to improve the quality of 2D-to-3D conversion.

SUMMARY OF THE INVENTION

The embodiments of this invention are disclosed to provide a method, system and medium for improving the quality of 2D-to-3D automatic conversion in a computing device by using machine learning techniques, in which by introducing machine learning techniques, image recognition can be more accurate, and the quality and result of 2D to 3D conversion can be improved.

To achieve the target mentioned above, embodiments of this invention provide a method, system and medium for improving the quality of 2D-to-3D automatic conversion in a computing device by using machine learning techniques, including: receiving new 2D image from user input; recognizing multiple objects in said new 2D image by using machine learning algorithm; determining the hierarchical relations among said objects according to the features of said objects; improving the quality of 3D image based on said hierarchical relations.

In one embodiment, before receiving new 2D image from user input, said method also includes: generating object set $K=\{k_1, k_2, \ldots, k_N\}$ according to the multiple image data from user input, wherein factor $k_N$ is the object data in said object set K and N is the number of factor $k_N$; determining the relationship indexes among objects in said object set K; storing said object set K and relationship indexes into one database.

In one embodiment, the above said generating object set K according to the multiple image data from user input specifically includes: (a) receiving multiple pairs of reference 2D image and their depth map from user input; (b) creating multiple layers for said reference 2D images for 2D to 3D conversion; (c) obtaining tags made for multiple objects in each said layer by the user, and assigning depth value for each said layer; and (d) creating said object data of said reference 2D images by combing data including said tags, depth values and object; by repeating (a) to (d) for each reference 2D image, creating said object set K based on said object data of multiple reference 2D images, wherein factor $k_N$ in said object set K represents each said object in the said object set K.

In one embodiment, above said obtaining relationship indexes among objects in said object set K includes: analyzing each pair of said reference 2D image and its depth map, and learning the mapping relationship between said reference 2D image and its depth map by data conversion and pattern recognition; calculating the relationships among said objects using conditional probability for all said objects in the said object set K and generating said relationship indexes; said relationship indexes are $P(k_j | k_{i+n} \ldots k_{i+2} k_{i+1} k_i)$, wherein $i=1, 2, \ldots, N$ and j is not equal to i.

In one embodiment, above said obtaining the hierarchical relations among said objects according to the features of said objects specifically includes: determining (or judging) whether said relationship index between these two said objects is smaller than a threshold value; if said relationship index is smaller than or equal to said threshold value, deciding these two said objects belong to the same depth level; if said relationship index is larger than said threshold value, deciding these two said objects do not belong to the same depth level, and further deciding the depth levels of these two said objects according to the depth values of these two said objects.

In one embodiment, above said obtaining the hierarchical relations among said objects according to the features of said objects specifically includes: based on said database, determining (or judging) the completeness of each said object in said new 2D image using machine learning algorithm; determining (or judging) whether each said object belongs to the same depth level according to the completeness of each said object.

In one embodiment, above said determining (or judging) whether each said object belongs to the same depth level according to the completeness of each said object specifically includes: if the completeness of two said objects is not the same, determining (or judging) that two said objects do not belong to the same depth level, and the complete one locates before the incomplete one; if the completeness of two said objects is the same, deciding the depth level of these two said objects according to the depth values of these two said objects.

In one embodiment, improving the quality of 3D image based on said hierarchical relation specifically includes: creating a data set $A=\{a_1, a_2, \ldots, a_n\}$ according to the objects in the said new 2D image, wherein said data set A is a subset of the said object set K, $a_n$ are objects recognized in the said new 2D image; n is the number of objects recognized in the said new 2D image; in the said data set A, defining one said object with tag as main object; within a pre-set search range $\beta$, searching multiple the first objects around the said main object, wherein said multiple the first objects belong to the same depth level as the said main object; using prediction function to create and adjust the depth map of the said new 2D image; generating 3D image based on the said new 2D image and the adjusted depth map.

In one embodiment, above said prediction function executes the following steps: creating the depth map of the said new 2D image; identifying the center of the depth value mass of each object in the said depth map, and representing them as set $C\{c_1, c_2, \ldots, c_n\}$; calculating the space distance between each said the first object and the said main object using the following equations: Spatial Distance=$c_{a_i}$-$c_{a_j}$, wherein $a_i$ is the said main object; $a_j$ is the said the first object; $c_{a_i}$ and $c_{a_j}$ are factors in the set C, and the centers of the depth value mass of all the factors in the data set A are stored in the set C; index i is not equal to j; and adjusting the depth value of the said depth map using the following equations: $Depth_{new}=Depth_{old}+Spatial Distance$, wherein $Depth_{old}$ is the original depth value of the said depth map; $Depth_{new}$ is the depth value of the adjusted depth map.

In another exemplary embodiment, the invention provides for a non-transitory processor-readable medium (or non-transitory computer-readable medium or non-transitory storage medium) having stored thereon a computer program for improving the quality of automatic conversion from 2D image to 3D image, the computer program comprising a set of instructions for causing one or more processors (or computer) to perform the steps of:

(a) receiving a new 2D image from user input;

(b) recognizing multiple objects in said new 2D image by using machine learning algorithm;

(c) obtaining hierarchical relations among those said multiple objects according to at least one feature of the said multiple objects; and improve the quality of 3D image based on said hierarchical relations.

In yet another exemplary embodiment, a non-transitory computer-readable medium having one or more instructions corresponding to an automatic conversion from 2D image to 3D image application that, when executed by one or more processors, cause the one or more processors to:

(a) receive, by the automatic conversion from 2D image to 3D image application, a new 2D image from a user input;

(b) recognize, by the automatic conversion from 2D image to 3D image application, multiple objects in said new 2D image by using machine learning algorithm; and (c) obtain, by the automatic conversion from 2D image to 3D image application, hierarchical relations among those said multiple objects according to at least one feature of the said multiple objects; and improve the quality of 3D image based on said hierarchical relations.

The beneficial effect of this invention is that each object in 2D image can be separated clearly, therefore the conversion result from 2D image to 3D image is improved in a more efficient manner.

BRIEF DESCRIPTION OF THE DRAWINGS

To describe the embodiments of this invention or technical solutions in prior art more clearly, the drawings required for embodiments descriptions are briefly introduced in the following part. Obviously, the drawings described below are merely exemplary embodiments of this invention, and are not drawn to scale.

DETAILED DESCRIPTION OF THE INVENTION

In the following part, the technical details of the embodiments of this invention will be described clearly and completely in combined with the drawings in the exemplary embodiments of this invention. Obviously, the embodiments described are exemplary. Based on the exemplary embodiments of this invention discussed herein, any other embodiments that can be envisioned by those skilled in the art based on this disclosure herein are also within the protective scope of this invention.

The exemplary embodiments of this invention provide a method, system and medium to improve the quality of automatic conversion from 2D to 3D using machine learning techniques. In the following part, this invention will be elaborated in details in combined with the drawings.

Figure 1:
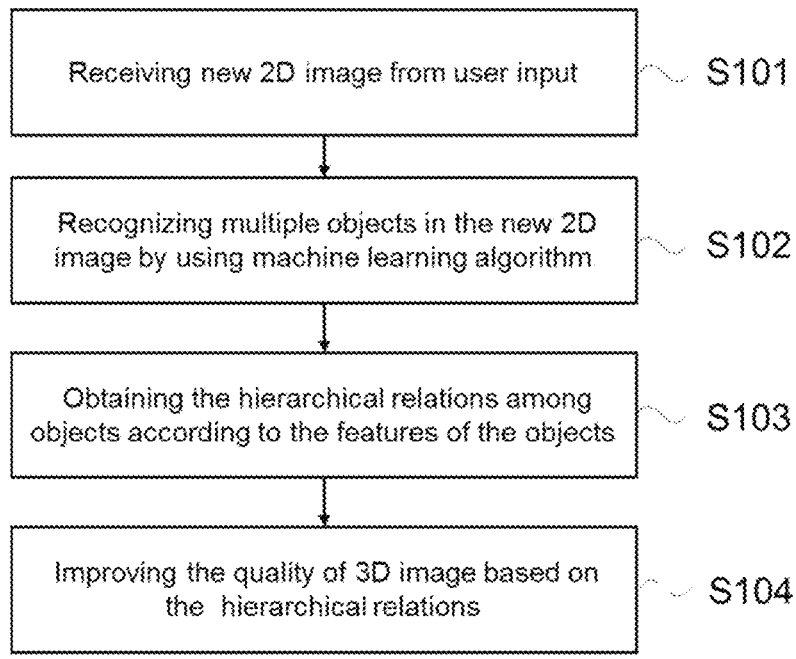
FIG. 1 is a flowchart of an exemplary method to improve the quality of automatic conversion from 2D image to 3D image using machine learning techniques according to an embodiment of this invention.

As shown in FIG. 1, the method to improve the quality of automatic conversion from 2D image to 3D image using machine learning techniques according to the embodiment of this invention comprises the following steps:

Step S101: receiving new 2D image from user input;

Step S102: recognizing multiple objects in the new 2D image by using machine learning algorithm;

Step S103: obtaining the hierarchical relations among objects according to at least one features of the objects; and Step S104: improving the quality of 3D image based on the hierarchical relations.

By applying above mentioned step S101 to step S104, the method to improve the quality of automatic conversion from 2D to 3D using machine learning techniques according to the embodiment of this invention can separate each object in a 2D image clearly, and improve the conversion quality from 2D to 3D image.

Combined with detailed examples, each step in the method to improve the quality of automatic conversion from 2D to 3D using machine learning technique according to the embodiment of this invention will be elaborated in details below.

The machine learning techniques adopted in the exemplary embodiment of this invention are realized based on a database of machine learning. In one embodiment, the database is created by the following steps:

Step S201: generating object set K={$k_1$, $k_2$, ..., $k_N$} according to the image data from user input;

Step S202: obtaining the relationship indexes among objects in the object set K; and Step S203: storing the object set K and relationship indexes into one database.

Above mentioned step S201 is generating object set K={$k_1$, $k_2$, ..., $k_N$} according to the image data from user input, wherein factor $k_N$ is the object data in the object set K and N is the number of factors $k_N$.

Figure 2:
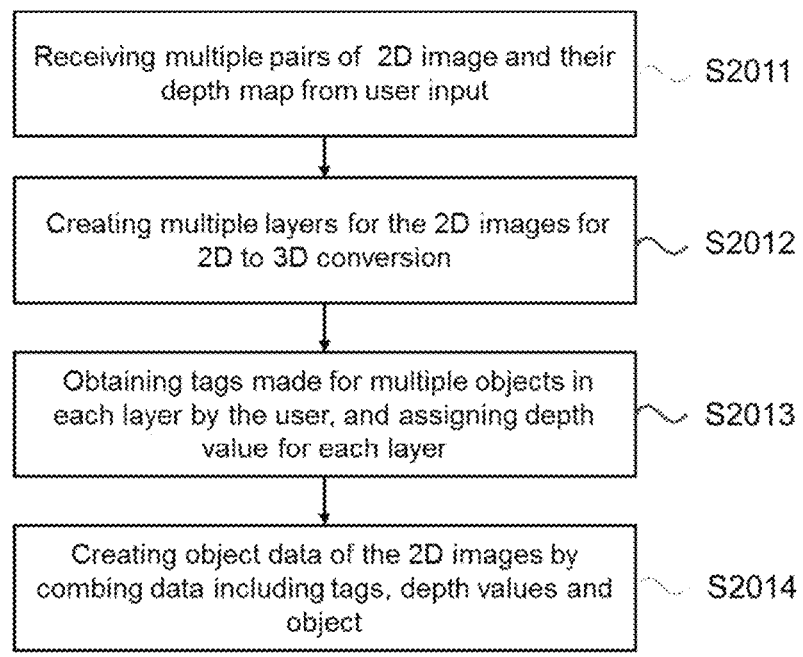
FIG. 2 is a flowchart of detailed steps for preparation stage of training data set according to an embodiment of this invention.

In specific application, this step is the preparation stage for training data set. As shown in FIG. 2:

Step S2011: receiving multiple pairs of reference 2D image and their depth map from user input;

Step S2012: creating multiple layers for the reference 2D images for 2D to 3D conversion;

Step S2013: obtaining tags made for multiple objects in each layer by the user, and assigning depth value for each layer;

Step S2014: creating object data of the reference 2D images by combing data including tags, depth values and object; and Then, above mentioned step S2011 to step S2014 are repeated for each reference 2D image from user input, and object set K is created based on the object data of multiple reference 2D images, wherein factor $k_N$ in said object set K represents each object data in the object set K.

Above mentioned step S202 is obtaining relationship indexes among objects in the object set K.

After the object set K is created, relationship indexes among objects is obtained for each object in the object set K. Specifically, the process to obtain the relationship index mainly comprises:

analyzing each pair of 2D image and its depth map, and learning the mapping relationship between the 2D image and its depth map by data conversion and pattern recognition; and calculating the relationship among objects using conditional probability for each object in the object set K and generating relationship indexes; the indexes are $P(k_j|k_{i+n} \ldots k_{i+2}k_{i+1}k_i)$, wherein i=1, 2, ..., N and j is not equal to i.

Above mentioned step S203 is storing the object set K and relationship indexes into one database.

After the object set K and the relationship indexes among objects are created, the object set K and the corresponding relationship indexes are stored into one database, used as data basis for the subsequent image analysis, recognition processing.

After the database for machine learning has been created by above mentioned step S201 to step S203, step S101 can be executed to receive new 2D image from user input. In real applications, such image can be static image data or one frame image data from streaming media (e.g. the i frame from streaming media) etc. However, it shall not be limited in this embodiment.

Above mentioned step S102 is recognizing multiple objects in the new 2D image by using machine learning algorithm. Multiple objects in the new 2D image from user input are recognized by using machine learning algorithm based on the database created from above mentioned step S201 to step S203 to divide objects in the 2D image into different layers.

In the exemplary embodiments of this invention, such machine learning algorithm can be, for example, Statistical Object Driven Depth Map Correction Method, but not be limited to it in this invention. The machine learning algorithm can also be realized using for example Deep Neural Network (DNN) algorithm; or based the powerful and high efficient parallel calculation capability provided by GPU, this machine learning algorithm can also be realized using CUDA programming algorithm.

Above mentioned step S103 is obtaining the hierarchical relations among objects according to the features of the objects. In one embodiment, obtaining the hierarchical relations among objects according to the features of the objects compromises two aspects. In one aspect, it means obtaining the relationship indexes among objects using conditional probability calculation and using this relationship indexes to decide whether two objects belong to the same depth level. In another aspect, it means identifying the completeness of each object in the 2D image based on the completeness data of the object in this new 2D image using machine learning algorithm, and deciding whether two objects belong to the same depth level according to the relationship between the completeness of each object.

Specifically, deciding whether two objects belong to the same depth level using relationship index between two objects means deciding it by determining (or judging) whether the relationship index is smaller than a threshold value. If the relationship index is smaller than or equal to the threshold value, it is decided that these two objects belong to the same depth level.

If the relationship index is larger than the threshold value, it is decided that these two said objects do not belong to the same depth level. In this case, the depth levels of these two objects according to the depth values of these two objects are further decided to decide the position relationship between these two objects after being converted to 3D image. Wherein, the bigger the depth value is, the closer to white the depth map of the object is and the closer to the front its position in the 3D image is.

In another embodiment, deciding whether two objects belong to the same depth level according to the relationship between the completeness of each object means identifying the completeness of each object in the new 2D image based on the above mentioned database using machine learning algorithm; deciding whether two objects belong to the same depth level according to the completeness of each object; if the completeness of these two objects is not consistent, it means for these two objects, one of them blocks part of the other one.

For example, in a 2D image, one person is standing in front of a wall. By using machine learning algorithm, it can be recognized that objects in this image are wall and person, and the image of the wall is not complete and blocked by the person. Therefore, it can be decided that these two objects do not belong to the same depth level, and the complete object locates in front of the incomplete one.

If the completeness of two objects is consistent, the depth levels of these two objects according to the depth values of these two objects are further decided to decide the position relationship between these two objects after being converted to 3D image. Wherein, the bigger the depth value is, the closer to white the depth map of the object is and the closer to the front its position in the 3D image is.

Figure 3:
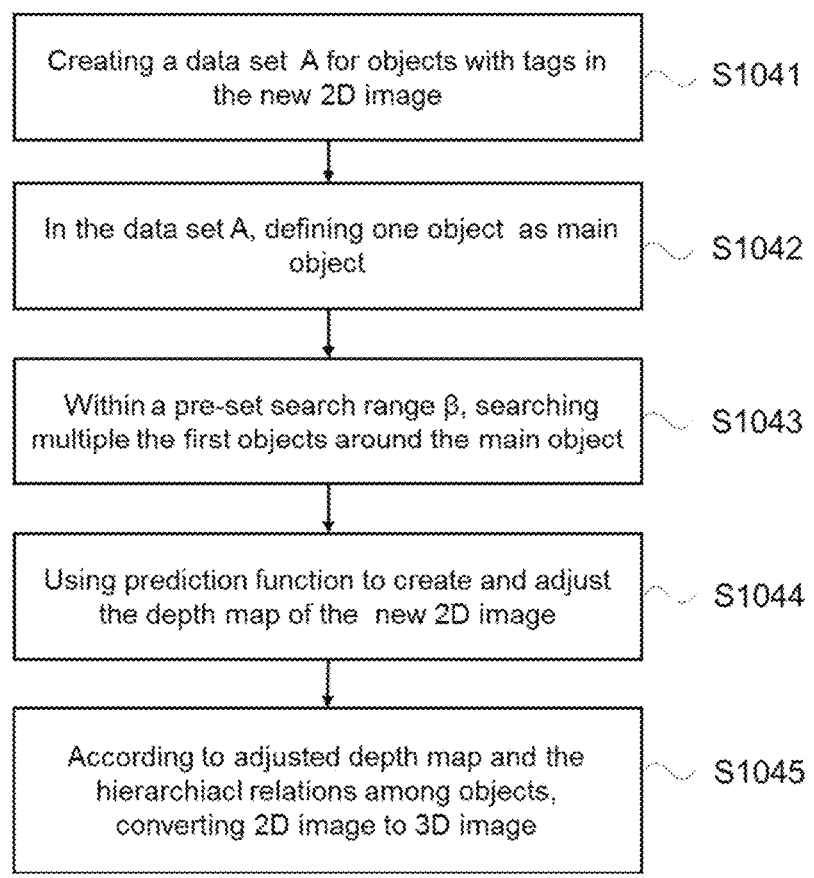
FIG. 3 is a flowchart of detailed steps for processing of a step S104 according to an embodiment of this invention.

Above mentioned step S104 is improving the quality of 3D image based on the hierarchical relations. Specifically, as shown in FIG. 3, this step mainly comprises:

Step S1041: creating a data set $A=\{a_1, a_2, \ldots, a_n\}$ for objects with tags in the new 2D image, wherein data set A is a subset of the object set K, and $a_n$ are objects recognized in the new 2D image; n is the number of objects recognized in the new 2D image;

Step S1042: in the data set A, one of the objects is defined as the main object;

Step S1043: within a pre-set search range β, searching multiple the first objects around the main object; within this search range β, using person as the main object, searching multiple the first objects around it to be bag, clothes, gloves, scarf and pants etc.; wherein multiple the first objects belong to the same depth level as the main object; since when bag, clothes, gloves, scarf and pants and person are objects, they belong to the same depth level, it is guaranteed that during the subsequent image conversion, bag, clothes, gloves, scarf and pants are in the same image layer or hierarchy as person, and bag, clothes, gloves, scarf and pants will not be mixed with the background.

Step S1044: using prediction function to create and adjust the depth map of the said new 2D image;

Wherein, the prediction function is specifically use to execute the following steps:

First, creating the depth map of the new 2D image from user input;

Definition Depth Value=z=D(x, y) is the expression of depth value of a specific pixel in the 2D depth map.

Then, a) identifying the center of the depth value mass of each object according to the automatically generated depth map (e.g. the depth map generated before using Statistical Object Driven Depth Map Correction Method), and representing them as set $C\{c_1, c_2, \ldots, c_n\}$;

To the factor $C_n=(\overline{x_n}, \overline{y_n}, \overline{z_n})$ in this set:

$$\overline{x_n} = \frac{\iiint_{R_n} D(x,y)x\,dV}{\iiint_{R_n} D(x,y)\,dV} = \frac{M(yz)}{\text{Mass}},$$

$$\overline{y_n} = \frac{\iiint_{R_n} D(x,y)y\,dV}{\iiint_{R_n} D(x,y)\,dV} = \frac{M(xz)}{\text{Mass}},$$

$$\overline{z_n} = \frac{\iiint_{R_n} D(x,y)z\,dV}{\iiint_{R_n} D(x,y)\,dV} = \frac{M(xy)}{\text{Mass}},$$

wherein, D(x,y) is the depth value in coordinate (x, y) according to the automatically generated depth map (e.g. the depth map generated before using Statistical Object Driven Depth Map Correction Method);

$R_n$ is the specific object in the data set A of the new 2D image;

To above mentioned specific objects, for example, for a new 2D image comprising apple, cloud, person etc., the above mentioned data set A={a1=apple,a2=cloud, a3=person}, and $R_{a_1}$ are the pixels on and within the edge of the apple in the new 2D image; $R_{a_2}$ are the pixels on and within the edge of the cloud in the new 2D image; $R_{a_3}$ are the pixels on and within the edge of the person in the new 2D image;

$$\text{Mass}=\iiint_{R_n} D(x,y)\,dV,$$

for the first axis distance of the depth function in the coordinate plane:

$$M(yz)=\iiint_{R_n} D(x,y)x\,dV,$$

$$M(xz)=\iiint_{R_n} D(x,y)y\,dV,$$

$$M(xy)=\iiint_{R_n} D(x,y)z\,dV,$$

b) measuring the space distance between objects:

Spatial Distance=Center of Depth-Value-Mass$_{ai}$−Center of Depth-Value-Mass$_{aj}$, The above mentioned equation can be further simplified as: $SD(i,j)=c_{a_i}-c_{a_j}$, wherein, SD(i,j) is the space distance between object $c_{a_i}$ and $c_{a_j}$;

$a_i$ and $a_j$ are factors in the data set A;

subscript i is not equal to j;

$c_{a_i}$ and $c_{a_j}$ are factors in the set C, and the centers of the depth value mass of all the factors in the data set A are stored in the set C.

Further, adjusting the depth value of the said depth map using the following equations:

Depth$_{new}$=Depth$_{old}$+Spatial Distance, wherein, $D_{new}$ and $D_{old}$ can be expressed as a matrix. Each item in this matrix is the depth value of one specific pixel in the specific object:

$$D = \begin{bmatrix} d_{11} & \cdots & d_{1n} \\ \vdots & \ddots & \vdots \\ d_{m1} & \cdots & d_{mn} \end{bmatrix}.$$

Further, executing step S1045: according to above mentioned adjusted depth map and obtained the hierarchical relations among objects, converting 2D image to 3D image. Since by executing above mentioned steps, the depth level of each object in the 2D image is defined and the depth map has been adjusted, the relationship among objects shall be much dearer in the 3D image, which is converted from 2D image in this step, and the quality of 2D-to-3D conversion is improved.

Figure 7:
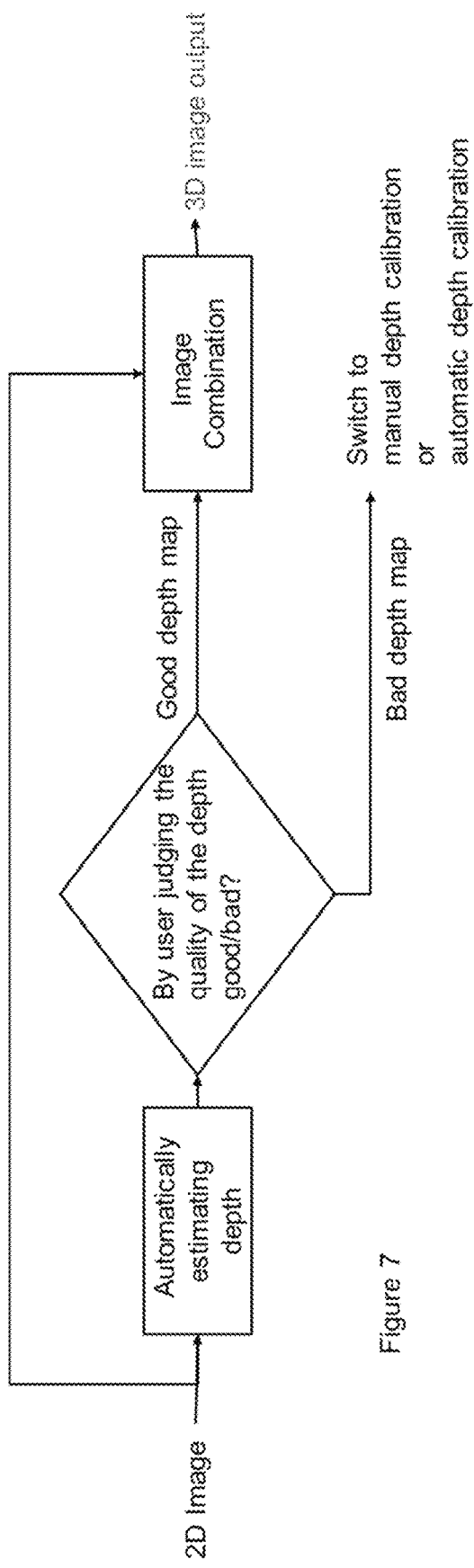
FIG. 7 is a flowchart of 2D to 3D conversion technique in prior art.

For 2D to 3D conversion techniques in prior art, as shown in FIG. 7, its main process comprises: automatically estimating depth for the 2D image from input, then judging whether the quality of the estimated depth is good or bad by the user. For depth map with good quality, it will be combined with the 2D image from input to generate and output 3D image; for depth map with bad quality, it will be processed with depth calibration through some available conversion engines or techniques (classified as manual calibration and automatic calibration).

Figure 8:
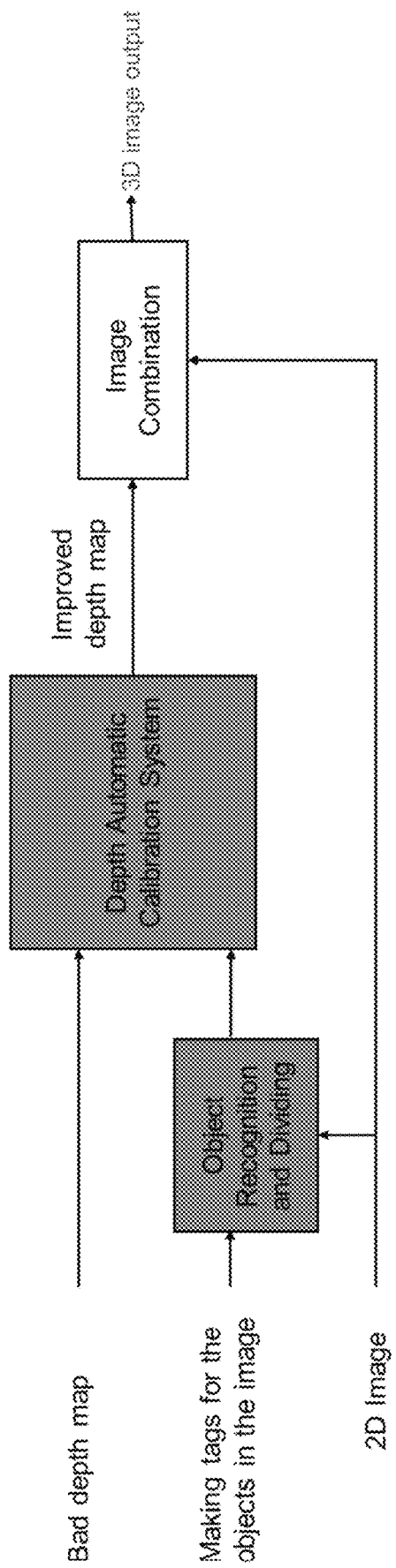
FIG. 8 is a flowchart of 2D to 3D conversion technique according to an embodiment of this invention.

But for the method to improve the quality of automatic conversion from 2D to 3D using machine learning techniques according to the embodiment of this invention, as shown in FIG. 8, it comprises main process:

Making tags for the multiple objects in the image for the 2D image from input, and executing object recognition and dividing layers to obtain the hierarchical relations among objects; then, using the method to improve the quality of automatic conversion from 2D to 3D using machine learning techniques according to the embodiment of this invention, executing depth automatic calibration for different kind of images (good depth map, bad depth map) to generate improved depth map and combine it with 2D image to generate 3D image output; therefore the quality of 2D image to 3D image conversion is improved.

It is obvious that the main advantages of the method to improve the quality of automatic conversion from 2D to 3D using machine learning techniques according to the exemplary embodiment of this invention are:

1. In the recognition level of pattern conversion, it can adapt to the new features and patterns in the 2D image, and improve the output result (improve the effect of the converted 3D image);

2. In the decision behavior level, it can be helpful in reducing the time needed for 3D conversion since more accurate depth map can be created. And it can reduce manual involvement in the conversion process.

3. In the knowledge acquisition level, human knowledge can be learned and acquired during the 2D to 3D conversion process, and the knowledge acquired during the whole processing flow can be reused.

Figure 4:
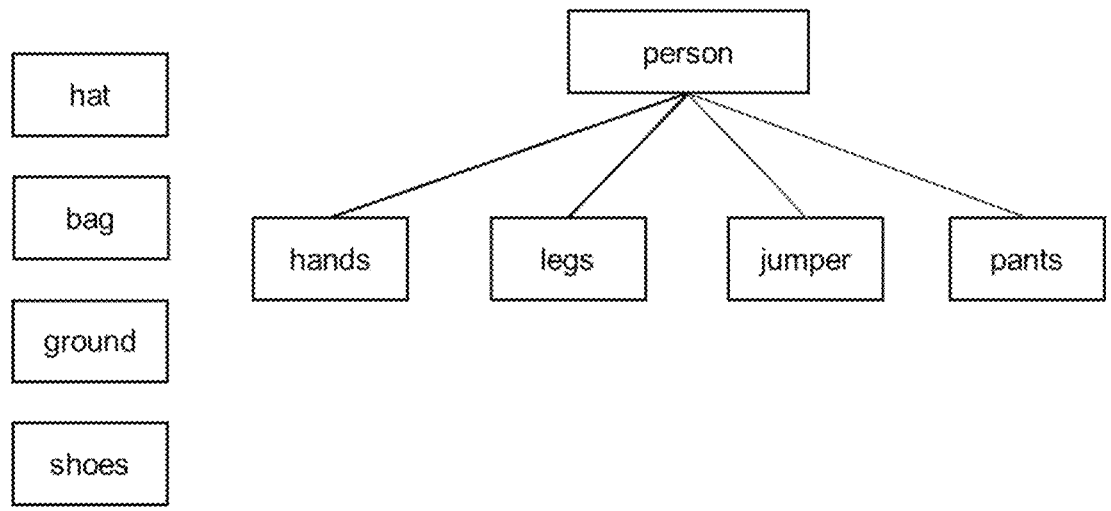
FIG. 4 is a schematic diagram of relationship structures of objects in the data set A in the new 2D image according to an embodiment of this invention.
Figure 5:
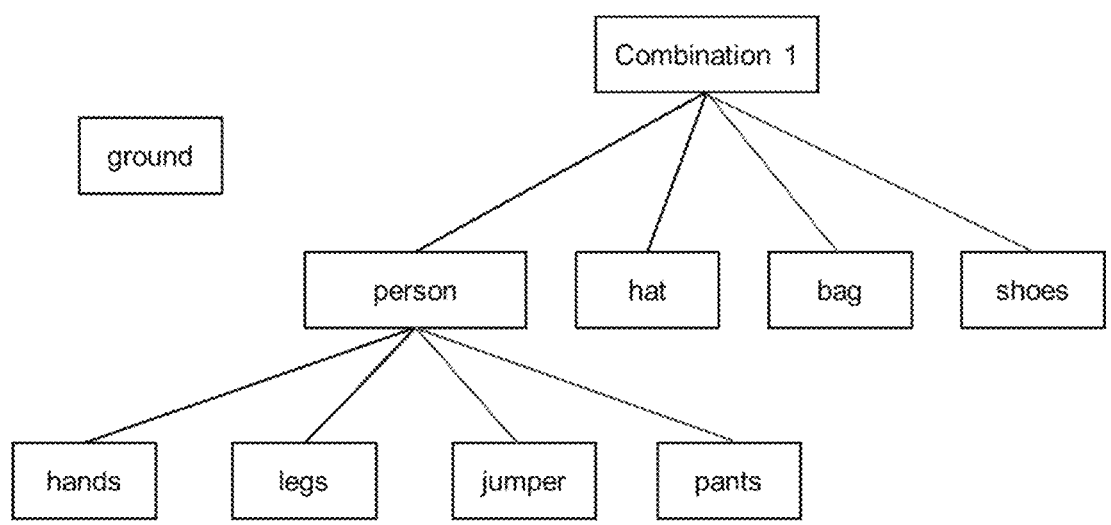
FIG. 5 is a schematic diagram of a hierarchical relation of objects recognized in the new 2D image according to an embodiment of this invention.
Figure 6:
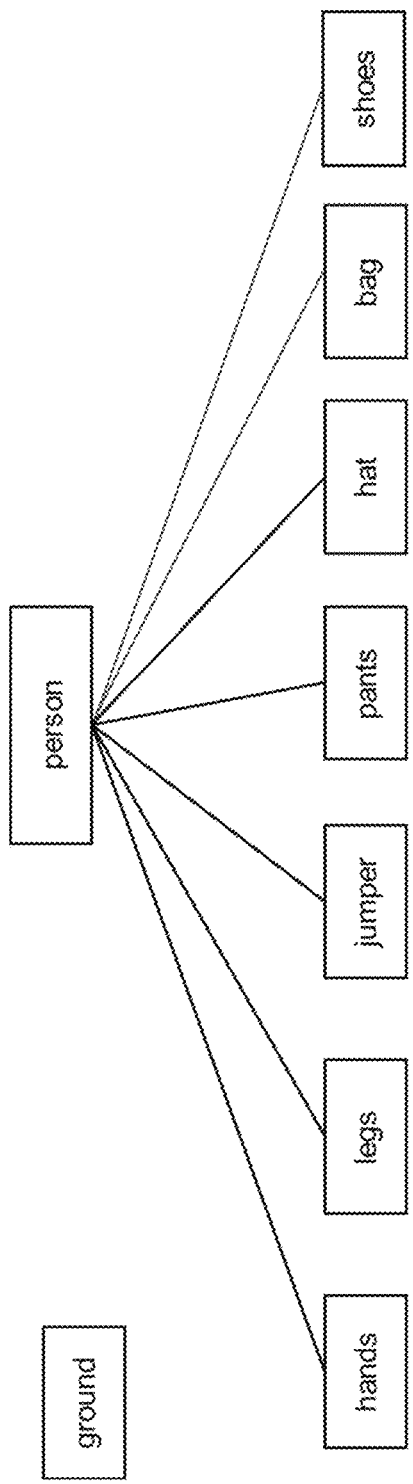
FIG. 6 is a schematic diagram of the re-organized relationship structures of objects recognized in the new 2D image according to an embodiment of this invention.

In one specific embodiment, the flow to process the new 2D image from user input using the method to improve the quality of automatic conversion from 2D to 3D using machine learning techniques according to the embodiment of this invention is as the following:

a) Receiving the new 2D image from user input;

b) Identifying the objects in the new 2D image by searching object set K. Such objects comprise: hat, bag, person and shoes. Those objects belong to data set A, and data set A is a subset of object set K (i.e. $A \subseteq K$.). The object relationship table shown in FIG. 4 can be used to represent the basic structure in the data set A.

c) Since in above mentioned objects, shoes, bag and hat belong to part of the person, shoes, bag and hat shall be in the same depth level as the person. Therefore, those three objects are combined with "person" to become "combination 1". The hierarchical relations among those objects in "combination 1" is shown in FIG. 5.

d) Renaming "combination 1" to "person", so that the relationship between multiple objects and person object can be combined together, as shown in FIG. 6. Correspondingly, the relationship index of the person need to be updated. Next time in a process flow, if it is shown that there are shoes, bag and hat around a person in a new 2D image, and if the probability of those objects being input as the combination is relative high, it is highly possible that they are automatically combined and identified as belonging to "person" tag.

e) Since shoes, bag and hat belong to part of the person object, the depth levels of those objects will be adjusted.

For example:

If the depth value of the person object is 178, the depth value of the shoes, bag and hat is 129, the space distance between the person and (shoes, bag and hat) is:

Spatial Distance=Center of Depth-Value-Mass$_{person}$−Center of Depth-Value-Mass$_{(Shoes,Bag,Hat)}$=178−129=49.

The depth value of the depth map of (shoes, bag and hat) is adjusted using the following equation:

Depth$_{new}$=Depth$_{old}$+Spatial Distance.

Therefore, after the adjustment, (shoes, bag and hat) objects have the same depth value as the person object. In the sequent image conversion process, (shoes, bag and hat) objects will be converted with person object as a combination, and (shoes, bag and hat) will not be converted to background due to the color of (shoes, bag and hat) objects are close to that of the background. By doing that, the quality of 2D image to 3D image conversion is further improved and enhanced.

Those skilled in the art may comprehend that all or part of the steps in the methods of the above mentioned embodiments can be realized by related hardware which operated by program. Such program may be stored in a storage medium readable by computer, such as ROM/RAM, disk and CD-ROM etc.

The above can be in the form of an automatic conversion from 2D image to 3D image application that can be executed on one or more computing devices. Such computing devices include, but not limited to, mobile devices, digital personal assistants, tablet computers, phablet devices, desktop computers, laptop computers, digital cameras, digital photo frames or the like.

In above mentioned specific embodiments, the objective, technical schemes and beneficial effect of this invention are further elaborated in details. It shall be comprehended that the above mentioned are only specific, exemplary embodiments of this invention, and shall not be used to limit the protection scope of this invention. Within the essence and principle of this invention, any modifications, replacements and variations shall all be included in the protection scope of this invention.

What is claimed is:

1. A non-transitory processor-readable medium storing code representing instructions to be executed by a processor system within an embedded environment, the code comprising (a) code to cause the processor system to: improve the quality of automatic conversion from 2D to 3D using machine learning techniques, receive a new 2D image from user input; recognize multiple objects in the new 2D image by using machine learning algorithm; obtain hierarchical relations among those said objects according to the features of the objects; and improve the quality of 3D image based on the hierarchical relations;

(b) code to cause the processor system to: before receiving the new 2D image from user input comprising, generate object set K={$k_1, k_2, \ldots, k_N$} according to a multiple image data from user input, wherein factor $k_N$ is the object data in the object set K; and N is the number of factors $k_N$; determine relationship indexes among objects in the object set K; and store the object set K and relationship indexes into a database; and (c) code to cause the processor system to: generate the object set K according to the multiple image data from user input, comprising: (1) receive multiple pairs of reference 2D image and their depth map from user input; (2) create multiple layers for the reference 2D images for 2D to 3D conversion; (3) obtain tags made for multiple objects in each said layer by the user, and assigning depth value for each said layer; and (4) create the object data of the reference 2D images by combing data including the tags, depth values and object; by repeating step (1) to step (4) for each reference 2D image, create the object set K based on the object data of multiple reference 2D images, wherein factor $k_N$ in the object set K represents each said object in the object set K.

2. The non-transitory processor-readable medium of claim 1, the code further comprising code to cause the processor system to: obtaining relationship indexes among objects in the object set K comprising: analysis each pair of the reference 2D image and its depth map, learn the mapping relationship between the reference 2D image and its depth map by data conversion and pattern recognition; calculate the relationships among the objects using conditional probability for all the objects in the object set K and generating the relationship indexes; the relationship indexes are $P(k_j|k_{i+n} \ldots k_{i+2}k_{i+1}k_i)$, wherein $i=1, 2, \ldots, N$ and j is not equal to i.

3. The non-transitory processor-readable medium of claim 2, the code further comprising code to cause the processor system to: obtain the hierarchical relations among the objects according to the features of the objects comprising: determine whether the relationship index between these two said objects is smaller than a threshold value; if the relationship index is smaller than or equal to the threshold value, decide these two said objects belong to a same depth level; if the relationship index is larger than the threshold value, decide these two said objects do not belong to the same depth level, and further deciding the depth levels of these two said objects according to the depth values of these two said objects.

4. The non-transitory processor-readable medium of claim 3, the code further comprising code to cause the processor system to: improve the quality of 3D image based on the hierarchical relation comprising: create a data set $A=\{a_1, a_2, \ldots, a_n\}$ according to the objects in the new 2D image, wherein the data set A is a subset of the object set K, and those objects $a_n$ are objects recognized in the new 2D image; n is the number of objects recognized in the new 2D image; in the data set A, define one said object as main object; within a pre-set search range β, searching multiple first objects around the main object, wherein the multiple first objects belong to the same depth level as the main object; use a prediction function to create and adjust a depth map of the new 2D image; generate 3D image based on the new 2D image and the adjusted depth map.

5. The non-transitory processor-readable medium of claim 4, the code further comprising code to cause the processor system to: the prediction function executes the following: create the depth map of the new 2D image; identify the center of the depth value mass of each object in the depth map, and representing them as set $C\{c_1, c_2, \ldots, c_n\}$; calculate the space distance between each said first object and the main object using the following equations: Spatial Distance=$c_{a_i}-c_{a_j}$, wherein $a_i$ is the main object; $a_j$ is the first object; $c_{a_i}$ and $c_{a_j}$ are factors in the set C, and the centers of the depth value mass of all the factors in the data set A are stored in the set C; index i is not equal to j; and adjust the depth value of the depth map using the following equations: $Depth_{new}=Depth_{old}+$Spatial Distance, wherein $Depth_{old}$ is the original depth value of the depth map; and $Depth_{new}$ is the depth value of the adjusted depth map.

6. The non-transitory processor-readable medium of claim 1, the code further comprising code to cause the processor system to: wherein obtain the hierarchical relations among the objects according to the features of the objects comprising: based on the database, determine the completeness of each said object in the new 2D image using machine learning algorithm; determine whether each said object belongs to a same depth level according to the completeness of each said object.

7. The non-transitory processor-readable medium of claim 6, the code further comprising code to cause the processor system to: wherein determine whether each said object belongs to the same depth level according to the completeness of each said object comprising: if the completeness of two said objects is not the same, determine that two said objects do not belong to the same depth level, and the complete one locates before the incomplete one; if the completeness of two said objects is the same, decide the depth level of these two said objects according to the depth values of these two said objects.

8. A method for improving the quality of automatic conversion from 2D to 3D using machine learning techniques, wherein the method comprising:
receiving a new 2D image from user input;
recognizing multiple objects in the new 2D image by using machine learning algorithm;
obtaining hierarchical relations among those said objects according to the features of the objects; and
improving the quality of 3D image based on the hierarchical relations,
wherein before receiving the new 2D image from user input, the method further comprising:
generating object set $K=\{k_1, k_2, \ldots, k_N\}$ according to a multiple image data from user input, wherein factor $k_N$ is the object data in the object set K; and N is the number of factors $k_N$;
determining relationship indexes among objects in the object set K; and
storing the object set K and relationship indexes into a database;
wherein the generating object set K according to the multiple image data from user input comprising:
(a) receiving multiple pairs of reference 2D image and their depth map from user input;
(b) creating multiple layers for the reference 2D images for 2D to 3D conversion;
(c) obtaining tags made for multiple objects in each said layer by the user, and assigning depth value for each said layer;
(d) creating the object data of the reference 2D images by combing data including the tags, depth values and object;
by repeating step (a) to step (d) for each reference 2D image, creating the object set K based on the object data of multiple reference 2D images, wherein factor $k_N$ in the object set K represents each said object in the object set K.

9. The method for improving the quality of automatic conversion from 2D to 3D using machine learning techniques according to claim 8, wherein obtaining relationship indexes among objects in the object set K comprising:
analyzing each pair of the reference 2D image and its depth map, and learning the mapping relationship between the reference 2D image and its depth map by data conversion and pattern recognition;

calculating the relationships among the objects using conditional probability for all the objects in the object set K and generating the relationship indexes;

wherein the relationship indexes are $P(k_j|k_{i+n} \ldots k_{i+2}k_{i+1}k_i)$, wherein i=1, 2, ..., N and j is not equal to i.

10. The method for improving the quality of automatic conversion from 2D to 3D using machine learning techniques according to claim 9, wherein obtaining the hierarchical relations among the objects according to the features of the objects comprising:

determining whether the relationship index between these two said objects is smaller than a threshold value;

if the relationship index is smaller than or equal to the threshold value, deciding these two said objects belong to a same depth level;

if the relationship index is larger than the threshold value, deciding these two said objects do not belong to the same depth level, and further deciding the depth levels of these two said objects according to the depth values of these two said objects.

11. The method for improving the quality of automatic conversion from 2D to 3D using machine learning techniques according to claim 10, wherein improving the quality of 3D image based on the hierarchical relation comprising:

creating a data set $A=\{a_1, a_2, \ldots, a_n\}$ according to the objects in the new 2D image, wherein the data set A is a subset of the object set K, and those objects $a_n$ are objects recognized in the new 2D image; n is the number of objects recognized in the new 2D image;

in the data set A, defining one said object as main object;

within a pre-set search range β, searching multiple first objects around the main object, wherein the multiple first objects belong to the same depth level as the main object;

using a prediction function to create and adjust a depth map of the new 2D image; and generating 3D image based on the new 2D image and the adjusted depth map.

12. The method for improving the quality of automatic conversion from 2D to 3D using machine learning techniques according to claim 11, wherein the prediction function executes the following steps:

creating the depth map of the new 2D image;

identifying the center of the depth value mass of each object in the depth map, and representing them as set $C\{c_1, c_2, \ldots, c_n\}$;

calculating the space distance between each said first object and the main object using the following equations:

Spatial Distance=$c_{a_i}-c_{a_j}$, wherein $a_i$ is the main object; $a_j$ is the first object; $c_{a_i}$ and $c_{a_j}$ are factors in the set C, and the centers of the depth value mass of all the factors in the data set A are stored in the set C; index i is not equal to j;

and adjusting the depth value of the depth map using the following equations:

$Depth_{new}=Depth_{old}+$Spatial Distance, wherein $Depth_{old}$ is the original depth value of the depth map; and $Depth_{new}$ is the depth value of the adjusted depth map.

13. The method for improving the quality of automatic conversion from 2D to 3D using machine learning techniques according to claim 8, wherein obtaining the hierarchical relations among the objects according to the features of the objects comprising:

based on the database, determining the completeness of each said object in the new 2D image using machine learning algorithm; and determining whether each said object belongs to a same depth level according to the completeness of each said object.

14. The method for improving the quality of automatic conversion from 2D to 3D using machine learning techniques according to claim 13, wherein determining whether each said object belongs to the same depth level according to the completeness of each said object comprising:

if the completeness of two said objects is not the same, determining that two said objects do not belong to the same depth level, and the complete one locates before the incomplete one; and if the completeness of two said objects is the same, deciding the depth level of these two said objects according to the depth values of these two said objects.

* * * * *